United States Patent [19]

Pierce

[11] 4,452,050
[45] Jun. 5, 1984

[54] ENERGY EFFICIENT WATER HEATING DEVICE AND SYSTEM

[75] Inventor: Jerry E. Pierce, Shaker Heights, Ohio

[73] Assignee: Heat Transfer Engineering, Inc., Elk Grove Village, Ill.

[21] Appl. No.: 475,199

[22] Filed: Mar. 14, 1983

[51] Int. Cl.³ .......................... F25B 41/00; F28F 3/12
[52] U.S. Cl. .................................. 62/196.4; 62/238.6; 165/169
[58] Field of Search .................... 62/238.6, 196.4, 296; 165/169, 180, 168, 181; 228/183, 263.16; 29/157.3 R

[56] References Cited

U.S. PATENT DOCUMENTS

| | | | |
|---|---|---|---|
| 2,629,228 | 2/1953 | Bergman | 165/169 |
| 2,716,866 | 9/1955 | Silva | 62/238.6 |
| 3,017,162 | 1/1962 | Haines | 62/238.6 |
| 3,785,167 | 1/1974 | Sahs | 62/296 |
| 4,123,837 | 11/1978 | Horner | 29/153.3 |

Primary Examiner—William E. Wayner
Assistant Examiner—John Sollecito
Attorney, Agent, or Firm—Harlan E. Hummer

[57] ABSTRACT

A thermal energy savings hot water heater is described as having a steel storage tank around which is spirally wrapped, a plurality of separate groups of copper coils that are formed of hollow copper tubing that has a rectangular cross-section for optimum surface contact or confrontation with the storage tank. A separate refrigeration system is connected to each group of copper coils, so that refrigerant vapor, from the compressors, is circulated through the coils for heating water within the tank instead of circulating the vapor to the condensers where the heating energy of the refrigerant is wasted into the ambient atmosphere.

A non-electrolytic, thermally conductive bonding cement is layered between the copper coils and outer surface of the tank to prevent any electrolytic reaction between the dissimilar metals of the coils and tank, and to fill in the voids between the coils and tank, to enhance the transfer of heat by conduction between the coils and tank, since the voids act to trap air and insulate the tank from the coils.

12 Claims, 3 Drawing Figures

ENERGY EFFICIENT WATER HEATING DEVICE AND SYSTEM

BACKGROUND OF THE INVENTION

The invention is concerned with saving thermal energy, especially thermal energy that is expended to heat water which is used for a variety of reasons in commercial establishments, such as fast food chain restaurants which generally operate on a high volume/low cost basis and are, therefore, appreciative of any savings in utilities, the cost of which has risen dramatically in the last few years.

A great deal of thermal energy is required to operate the various pieces of cooking and heating equipment that are used in such restaurants. Also, many of these restaurants employ from four to eight conventional refrigeration systems which waste tremendous amounts of heating energy to the ambient atmosphere.

U.S. Pat. Nos. 4,041,726 and 4,179,902 are directed to the use of water cooled condensers through which superheated refrigerant, from the compressors of a refrigeration system, is circulated to heat water, prior to circulation of the water to a hot water tank for storage. The '902 patent, in particular, shows and describes the use of a plate-type heat exchanger that has a waffle-like configuration through which superheated refrigerant vapor is circulated.

Such plate-type heat exchangers are known to be used in conjunction with conventional water heaters as a means of supplementing heating of the water inside the storage tank of the water heater. One, or a number of such heat exchangers, are wrapped around the outer peripheral surface of the storage tank which is usually made of steel. The waffled, plate heat exchanger is made of stainless steel to prevent any electrolytic reaction from taking place. It can be appreciated that the waffled shape of the heat exchanger consists of alternate peaks and valleys and that, at most, only the peaks will be in contact with the storage tank. Thus, the most efficient transferance of heat by conduction from the heat exchanger to the water tank, occurs only at these peak areas. Heat will be transferred between the valleys of the heat exchanger by radiation or convection which is not as efficient, since air, trapped in the valleys, acts as a thermal barrier or insulator. Stainless steel, from which such plate exchangers are made, has about ten times less thermal conductivity than copper. It can be appreciated from the above, that the above-described heat exchanger and method of adapting it to a hot water heater, are not the most desirable combination.

Moreover, the problems encountered by using such heat exchangers in connection with a number of refrigeration systems, are staggering. For example, suppose one wants to capture and use the normally wasted heating energy from six separate refrigeration systems which employ six different refrigerants that must be kept separated as they flow through the waffled plate heat exchanger. Peaks and valleys of the heat exchanger must be strategically blocked to form six, separated conduits through which the six different refrigerants are directed. Such a process is time cosuming and costly. Moreover, suppose two more refrigeration systems with two new and different refrigerants are desired to be adapted to the hot water heater. It is easily imagined that it is next to impossible to adapt the heat exchanger to accommodate two more conduits, especially if the flow of the other six refrigerants through the heat exchanger has been optimized.

The invention is designed to overcome these problems by the provision of a simple, highly efficient heat transferring device which readily adapts a conventional water storage tank for use with a number of refrigeration systems as a heat exchanger to capture and utilize in the heating of water in the tank, heating energy which is normally wasted into the ambient atmosphere from the refrigeration systems.

Briefly stated, the invention is in an energy savings and efficient water heating device and system which comprise a steel tank in which liquid is stored and heated, and a plurality of separate groups of copper coils which are formed of hollow copper tubing that has a rectangular cross-section and which is tightly coiled around the outer peripheral surface of the storage tank. A nonelectrolytic, thermal conductive bonding cement is layered between the copper coils and the steel tank to prevent any electrolytic reaction between the dissimilar metals of the coils and tank, and to fill any voids between the coils and tank to enhance the transfer of heat, by conduction, from the coils to the tank for subsequent transfer of heat to the water in the tank.

The number of groups or sets of copper coils can be easily changed to accommodate the addition or subtraction of one or more refrigeration systems. Moreover, the use of copper tubing with a rectangular cross-section produces optimum heat transferance to the storage tank. Thus, the invention has two major advantages; namely, improved heat transferance and adaptability to change.

DESCRIPTION OF THE DRAWING

The following description of the invention will be better understood by having reference to the accompanying drawing, wherein.

DETAILED DESCRIPTION OF THE DRAWING

Figures 1, 2, 3:
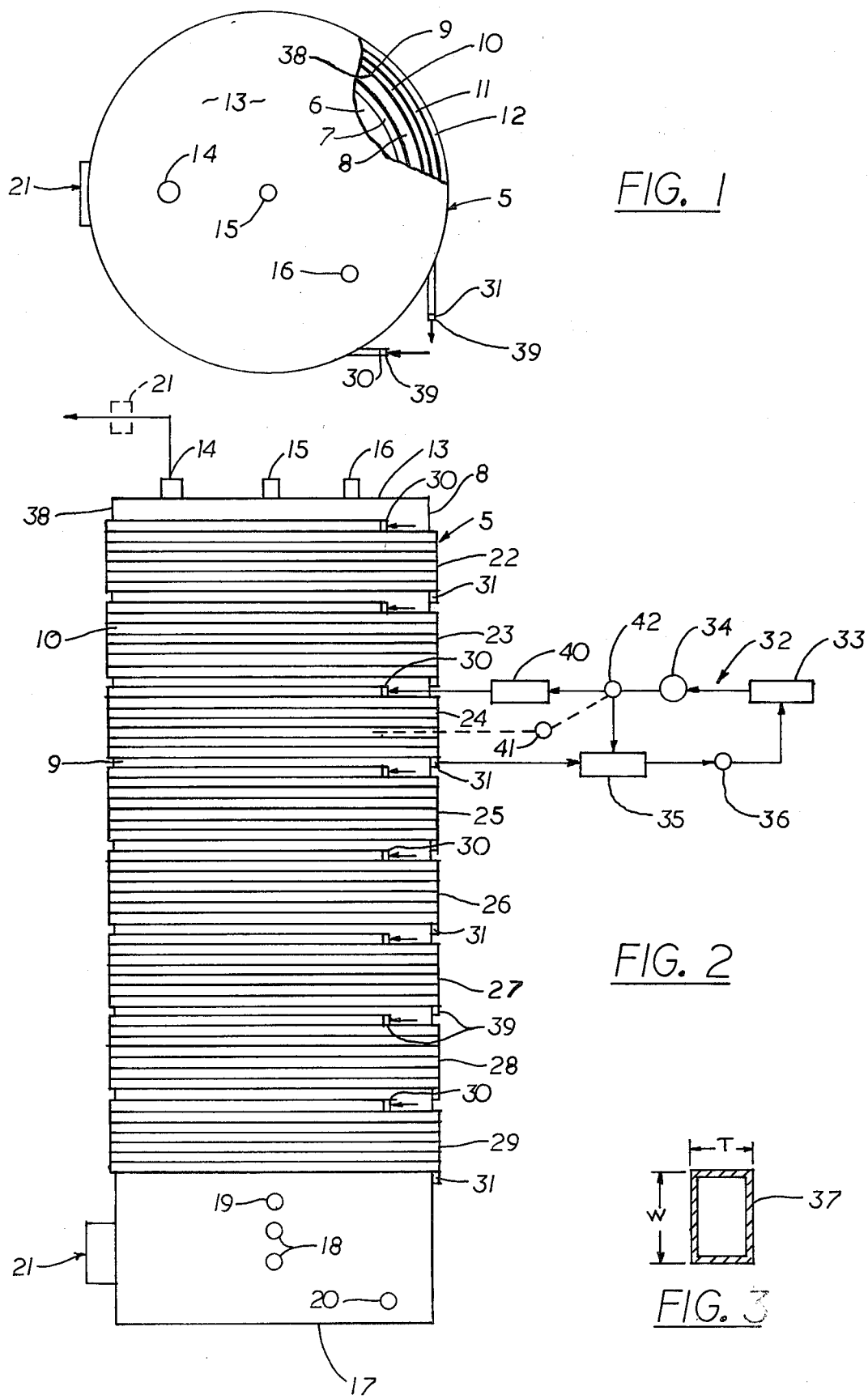
FIG. 1 is a plan view of a water heater which is made in accordance with the invention, and which has a portion removed to show essential parts of the heater.
FIG. 2 is a side view of the heater with the outer jacket and insulation removed to show the groups of copper coils that are wrapped around the storage tank of the heater which is also shown in connection with a typical refrigeration system that is schematically represented.
FIG. 3 is a cross-section of the tubing of which the copper coils are formed.

With particular reference to FIG. 1, there is shown a water heater 5 which essentially comprises, in successive order beginning from the innermost storage chamber 6 for holding water, any suitable liner 7, e.g. glass, on the inside of a cylindrical steel tank 8 in which the chamber 6 is formed, a layer of bonding material 9 between the tank 8 and a plurality of copper coils 10 which are wrapped around the tank 8, a covering layer of any suitable insulation 11, e.g. fiberglass, and an outer jacket or casing 12. Located in the top 13 of the storage tank 8 are a water outlet 14, a fitting 15 for a pressure safety release valve, and an opening 16 for receiving an anode. Located adjacent the bottom 17 of the steel storage tank 8, are one, of a pair of similar cold water inlets 18, and a pair of fittings 19, 20 for a conventional aquastat and drain cock. Any apropriate water heating unit 21 may be optionally provided to finalize heating the water to the desired temperature, e.g. 140° F.-160°

F. In the particular water heating system of the invention, such a heating unit 21 is located downstream of the water outlet 14 of the heater 5.

With reference to FIG. 2, the copper coils 10 comprise eight separate sets or groups 22-29 of copper coils, consisting of about seven wraps or coils each, spirally wrapped or coiled around the tank 8. Each of the groups 22-29 of copper coils has a fluid inlet 30 through which hot refrigerant vapor enters the coils, and a fluid outlet 31 from which refrigerant exits the coils. The fluid inlet 30 of each group of coils is spaced vertically above the associated fluid outlet 31, when the water heater 5 and tank 8 are in a normal, vertical operating position. The number of groups of coils is dependent on the corresponding number of refrigeration systems, since greater, more effective thermal savings are achieved by capturing the heating energy which is normally wasted to the ambient atmosphere by each of the refrigeration systems. Thus, each group of copper coils is coupled to a separate refrigeration system, e.g. system 32, which, for convenience, is shown only in conjunction with one group 24 of coils, this group being typical of the other groups of copper coils. Each of the refrigeration systems 32 comprises the essential components of an evaporator 33, a compressor 34, a condenser 35, an expansion valve 36, and a refrigerant which continuously circulates between the components.

Each of the groups of copper coils is formed by spirally wrapping or coiling around the storage tank 8, a piece of copper piping or tubing 37 which has a rectangular cross-section, as best seen in FIG. 3. The individual groups 22-29 of copper coils may be preformed apart from the storage tank 8 by any appropriate means, e.g. formed on a pattern which has the same cross-sectional shape as the storage tank 8. The copper tubing 37 has an outer dimensional width W and thickness T of ¾ and ½ inches, respectively, to provide an inside cross-sectional area which closely proximates the corresponding inside cross-sectional area of ⅜ inch diameter hollow copper tubing or piping that is normally used to circulate the refrigerant between the various components of the refrigeration system. Thus, there is no radical difference between the cross-sectional areas of the round and rectangular tubing to adversely affect the flow of refrigerant and change the fluid pressure which could seriously affect the operation of the compressor 34.

The copper tubing 37 is composed of what is generally called "soft" copper, i.e. copper which contains lead, to facilitate the formation and placement of the copper coils around the storage tank 8. The longer side or width W of the copper tubing 37 is placed closest the storage tank 8 as the copper tubing 37 is coiled around the tank 8. The copper tubing 37, because of its unusual rectangular configuration, provides optimum surface-to-surface contact with, or exposure to, the adjacent outer peripheral surface 38 of the storage tank 8, thereby optimizing the transfer of heat which is substantially greater than that achieved by round piping, or the waffle plate-type heat exchanger of the aforementioned patents, where only a small portion of the metal of the piping or heat exchanger actually contacts the storage tank 8. Moreover, the prior art devices are composed of stainless steel which has a coefficient of thermal conductivity which is almost ten times less than that of copper. Thus, the use of copper as a material for the tubing, together with the special flat-sided shape of the tubing, combines to achieve the best possible transference of heat from the superheated refrigerant vapor to the water via the copper coils and steel storage tank.

The use of copper tubing can cause electrolsis to take place between the dissimilar metals of the coils and tank. The prior art avoids this situation by using stainless steel to form the heat exchanger around the tank, at the expense of losing optimum heat transferance. However, this problem is easily solved by coating the outer peripheral surface 38 of the storage tank 8 with the bonding material 9, prior to the placement of the groups 22-29 of copper coils around the storage tank 8.

The bonding material 9 comprises any suitable cement which is non-electrolytic and thermally conductive. Such cements are commercially available and are generally alkaline based materials which have a high carbon content. The cement should also be non-combustible, since workmen may use soldering or welding torches during installation of the copper coils which are embedded in the cement shortly after it is applied to the outer peripheral surface 38 of the storage tank 8. The cement protects the storage tank 8 by preventing any electrolytic reaction between the copper of the coils and the steel of the tank. It also enhances thermal conductivity between the copper coils and the steel storage tank by filling in any small voids which form between the tightly wrapped coils and tank, and which can entrap air to insulate the tank from the coils.

The individual groups 22-29 of copper coils are readily removed and replaced, if they become defective for any reason. Conventional fittings 39 are provided at the fluid inlets 30 and the fluid outlets 31 to facilitate removal of the coils and to adapt the rectangular shaped copper tubing 37 to the round or circular sectioned tubing that is employed in the refrigeration systems. The number of groups of copper coils can be easily changed to accommodate any increase or decrease in the number of refrigeration systems that are used in the business, so that optimum heat recovery is always maintained.

In operation, tap water, for example, at a temperature of 50° F.-60° F., flows through the water inlets 18 into the storage chamber 6 of the tank 8, as cool liquid refrigerant enters the evaporator 33 where it is evaporated. The refrigerant vapor flows to the compressor 34 where it is compressed and heated to a temperature of, for example, 240° F., for subsequent circulation, under pressure, to the fluid inlet 30 of the associated group 24 of copper coils 10. It is desirable to circulate the hot refrigerant vapor first through any suitable muffler 40, prior to circulation to the fluid inlet 30, to dampen and muffle any pulsations in the flow of vapor from the compressor 34, so that the flow of vapor through the coils is smooth and even. The circular bends in the coils also act as a muffling device. Cooled refrigerant subsequently exits the coils and flows to the condenser 35 where the refrigerant is further cooled and condensed for subsequent passage to the evaporator 35 to repeat the cycle. It can be appreciated that less thermal energy is expended to condense the refrigerant in the condenser 35, because of the precooling experienced by the refrigerant in the copper coils. Thus, the refrigeration system 32 becomes more energy efficient and less costly to operate. Less heat is given off during the actual condensation of the refrigerant in the condenser 35. This is especially important in refrigeration systems, wherein the condenser is located indoors within a confined area of a building and not outdoors, as generally is the case. In such instances, another refrigeration system may be required to air condition and reduce the moisture content of the atmosphere surrounding the condenser in the confined area. The precooling of the refrigerant in the copper coils eliminates the need for an auxiliary refrigeration system, thereby providing tremendous savings in energy and the cost of the auxiliary refrigeration system.

A temperature sensing device 41 is used to monitor the temperature of the water inside the storage tank 8 and, when the temperature of the water reaches a certain level, e.g. 140° F. to 150° F., reacts to cause operation of a bypass valve 42 which, in turn, acts to circulate the refrigerant vapor from the compressor 34 directly to the condenser 35, thereby bypassing the copper coils, until the temperature of the water drops to a point where the sensor 41 again reacts, but this time to cause operation of the bypass valve 42 to circulate the refrigerant vapor to the copper coils for heating the coils, storage tank, and water in the tank. A separate sensor 41 can be used with each of the refrigeration systems, or a single sensor 41 can be used to control the flow of refrigerant vapor between all of the systems and copper coils associated therewith, depending on which design is desired. The temperature of the tap water is raised anywhere from about 7° F. to about 100° F., depending on the continued operation of the refrigeration systems and the demand for water which controls the residence time of the water inside the tank 8.

Thus, there has been described, a unique and highly improved thermal efficient water heater and system which capture as much heat as possible from a number of different refrigeration systems, so that there will minimal or no use of the conventional heating units 21 for heating the water. The design of the water heater is radical in that it utilizes copper as a material to form the tubing that is coiled tightly around the steel storage tank of the heater. Further, the copper tubing is unconventionally rectangular in cross-section for optimum surface-to-surface contact with the outer surface of the steel tank. This particular combination would be unthinkable, if it weren't for the layer of bonding cement which is applied to the outer cylindrical surface of the tank and, in which, the copper coils are embedded to prevent electrolysis between the dissimilar metals of the coils and tank, and to enhance thermal conductivity between the coils and tank by filling in between the coils and tank, any voids which could trap air and insulate the tank from the coils.

In addition to the above described thermal advantages, the use of groups of copper coils has the mechanical advantages of simple removal and replacement of a defective group of coils, and easy adaptation of the numbers of coils to any change in the number of refrigeration systems that are used in connection with the heater.

It can be envisioned that, in some cases where energy savings are not a critical factor, the rectangular tubing can be made of stainless steel. Thermal conductivity would be substantially less, but some savings could be realized in the elimination of the bonding cement between the coil sand tank. Only the mechanical advantages, as indicated above, would be achieved with such tubing. However, the savings in long term operational costs by using copper tubing, would seem to far outweigh the initial construction costs saved by using stainless steel tubing.

What is claimed is:

1. In combination:
   (a) a storage tank comprising an outer peripheral cylindrical steel surface which surrounds an enclosed chamber in which fluid is stored, the chamber, when the tank is in a vertical position, having (i) a closed top in vertical spaced relation above a closed bottom, (ii) a fluid inlet through which fluid enters the bottom of the chamber, and (iii) a fluid outlet through which fluid exits the top of the chamber;
   (b) hollow copper tubing coiled around the outer surface of the tank in conformance with the shape thereof between the fluid inlet and outlet, the tubing having a rectangular cross-section, wherein one of the flat sides of the tubing confronts the outer surface of the tank in close proximity thereto, the tubing being divided into a plurality of separate groups of coils through which different fluids can be simultaneously separately circulated, the groups of coils being in vertical spaced relation around the surface, the coils of each group being in close proximity to each other for greater tansfer of thermal energy, each group of coils terminating at a fluid inlet which is vertically spaced above a fluid outlet; and
   (c) a thin layer of hardened cement bonded to the outer steel surface of the tank between the surface and copper tubing, the cement being thermally conductive but non-electrolytic reactive to the surface and tubing, the layer of cement being sufficiently thick to prevent an electrolytic reaction between the dissimilar metals of the surface and tubing, and sufficiently thin not to adversely effect thermal conductivity between the surface and the tubing.

2. The combination of claim 1, which includes:
   (c) a plurality of separate refrigeration systems, each of which includes the essential components of an evaporator, a compressor, a condenser, and a refrigerant which constantly circulates between the components; and
   (d) means for connecting each of the refrigeration systems to a separate group of copper coils, so that refrigerant vapor, from the compressors, enters the groups of copper coils through the fluid inlets and exits the groups of copper coils through the fluid outlets for subsequent circulation to the condensers of the refrigeration systems.

3. The combination of claim 2, which includes a muffler interposed between each of the fluid inlets and the evaporator associated therewith, to dampen and muffle any pulsations in fluid flow from the compressors through the copper coils.

4. The combination of claim 3, which includes a sensor associated with at least one of the refrigeration systems, for monitoring the temperature of fluid inside the chamber of the tank, and means associated with the sensor and responsive thereto, for bypassing refrigerant vapor from at least one of the groups of copper coils to an associated condenser, when the temperature of the fluid in the chamber reaches a predetermined level.

5. The combination of claim 4, wherein each of the refrigeration systems has its own sensor and vapor bypassing means.

6. A system for heating liquid, such as water, comprising in combination:
   (a) a storage tank in which liquid is heated and stored, the tank having a cylindrical outer surface which consists essentially of steel;

(b) a plurality of separate groups of coils spirally wrapped around the outer surface of the tank, each group of coils comprising a plurality of coils formed of hollow copper tubing which has a rectangular cross-sectional configuration and which is positioned so that one of the flat sides of the tubing confronts the outer surface of the tank in close proximity thereto, the adjacent flat sides of adjacent coils of each group of coils being in close proximity to each other to optimize the transfer of heat between the coils and outer surface of the tank, each group of coils including a fluid inlet and a fluid outlet which is vertically spaced below the fluid inlet, when the tank is in a normal vertical position;

(c) a plurality of refrigeration systems, each of which includes the essential components of an evaporator, a compressor, a condenser, an expansion valve, piping connecting the components, and a refrigerant circulating through the piping between the components;

(d) means for coupling the piping of each of the refrigeration systems to a separate group of coils so that refrigerant vapor flows from the compressor into the associated group of coils through the fluid inlet and subsequently exits the coils through the fluid outlet to the condenser for passage therethrough; and (e) a thin layer of bonding material cemented to the outer surface of the tank between the coils and the outer surface of the tank, the bonding material being non-electrolytic reactive relative to the coils and surface and thermally conductive, the layer of bonding material being sufficient-thick to prevent any electrolytic reaction between the copper of the coils and the steel of the outer surface of the tank, and sufficiently thin not to adversely effect the transfer of heat from the copper coils to the steel tank.

7. The system of claim 6, which includes:

(f) means for monitoring the temperature of liquid within the chamber of the tank and bypassing refrigerant vapor from the coils to the condensers, when the temperature of the liquid in the tank reaches a predetermined level.

8. The system of claim 7, which includes:

(g) means interposed between each compressor and associated group of coils, for dampening and muffling any pulsations in the flow of vapor from the compressors to the coils.

9. The system of claim 8, wherein the piping of the refrigeration systems has a circular cross-section that has approximately the same cross-sectional area as that of the copper tubing of the coils, so as not to adversely affect the flow of refrigerant therebetween, and the coupling means includes an adapter at each of the fluid inlets and outlets for adapting the rectangular copper tubing of the coils to the circular copper piping of the refrigeration systems.

10. The system of claim 9, wherein the outer dimensions (W,T) of the rectangular tubing of the coils are ¾ inches and ½ inches.

11. The system of claim 9, wherein the temperature monitoring means (f) includes a sensor associated with each of the refrigeration systems for sensing the temperature of liquid in the tank, and a bypass valve in the piping of each refrigeration system between the evaporator and muffling means (g) for directing refrigerant vapor to the condenser and bypassing the coils, when the temperature of the liquid reaches a certain level.

12. The system of claim 9, which includes means downstream of the storage tank for heating liquid after it leaves the tank.

* * * * *